(12) United States Patent
Tsushima et al.

(10) Patent No.: US 7,150,797 B2
(45) Date of Patent: Dec. 19, 2006

(54) FILLER MATERIAL FOR USE IN WELDING OF MG-CONTAINED ALUMINUM ALLOY DIE-CAST MEMBERS, WELDING METHOD, AND WELDED ARTICLE

(75) Inventors: Kenji Tsushima, Yokohama (JP); Takenori Hashimoto, Oyama (JP)

(73) Assignees: Nissan Motor Co., Ltd., Yokohama (JP); Showa Denko K.K., Tokyo (JP)

( * ) Notice: Subject to any disclaimer, the term of this patent is extended or adjusted under 35 U.S.C. 154(b) by 38 days.

(21) Appl. No.: 10/869,960

(22) Filed: Jun. 18, 2004

(65) Prior Publication Data

US 2005/0023258 A1    Feb. 3, 2005

Related U.S. Application Data

(60) Provisional application No. 60/482,500, filed on Jun. 26, 2003.

(30) Foreign Application Priority Data

Jun. 20, 2003   (JP)   ............................. 2003-176313

(51) Int. Cl.
  *B23K 35/34*    (2006.01)
  *B23K 26/00*    (2006.01)
(52) U.S. Cl. .................. 148/24; 148/26; 219/121.63; 219/121.64; 219/146.22; 228/223

(58) Field of Classification Search ............... 428/650, 428/385, 469, 696; 148/24; 75/302; 219/121.64, 219/146.22, 146.52
See application file for complete search history.

(56) References Cited

U.S. PATENT DOCUMENTS 5,755,374 A * 5/1998 Prigmore ..................... 228/223
5,968,288 A * 10/1999 Willenberg et al. ........... 148/26
6,548,191 B1 * 4/2003 Osame et al. ................ 428/654

FOREIGN PATENT DOCUMENTS

| JP | 6-304780 | 11/1994 |
| JP | 7-96396 | 4/1995 |
| JP | 2001-353591 | 12/2001 |

* cited by examiner

*Primary Examiner*—Jennifer C. McNeil
*Assistant Examiner*—Timothy M. Speer
(74) *Attorney, Agent, or Firm*—Oblon, Spivak, McClelland, Maier & Neustadt, P.C.

(57) ABSTRACT

An aluminum alloy filler material for use in welding of metal members including at least one aluminum die-cast member containing Mg includes an aluminum or an aluminum alloy as base material and Al—K—F series flux. The Al—K—F series flux is contained by 2 to 4 mass % with respect to the entire filler material.

16 Claims, 5 Drawing Sheets

FILLER MATERIAL FOR USE IN WELDING OF MG-CONTAINED ALUMINUM ALLOY DIE-CAST MEMBERS, WELDING METHOD, AND WELDED ARTICLE

This application claims priority under 35 U.S.C. § 119 to Japanese Patent Applications No. 2003-176313 filed on Jun. 20, 2003 and U.S. Provisional Application No. 60/482,500 filed on Jun. 26, 2003, the entire disclosure of which are incorporated herein by reference in their entireties.

CROSS REFERENCE TO RELATED APPLICATIONS

This application is an application filed under 35 U.S.C. § 111(a) claiming the benefit pursuant to 35 U.S.C. § 119(e)(1) of the filing date of U.S. Provisional Application No. 60/482,500 filed on Jun. 26, 2003 pursuant to 35 U.S.C. § 111(b).

BACKGROUND OF THE INVENTION

1. Field of the Invention

The present invention relates to a filler material to be used at the time of welding aluminum alloy die-cast members by laser welding for example. It also relates to a welding method using such filler material and a welded article.

2. Description of Related Art

The following description sets forth the inventor's knowledge of related art and problems therein and should not be construed as an admission of knowledge in the prior art.

For example, one of the most effective ways to attain high mileage of automobiles is to reduce the weight of the automobile. Accordingly, active attempts to replace conventional iron parts of automobiles with aluminum alloy parts have been performed.

However, merely replacing conventional iron material with aluminum alloy causes a substantially increased manufacturing cost.

Under the circumstances, in order to attain low-cost aluminum alloy automobile members, e.g., body members, chassis members and suspension members, it has just begun to use aluminum alloy die-cast members as space frame joints or B-pillars for example.

As a method of joining an aluminum alloy die-cast member to an aluminum alloy die-cast member or a die-cast member to a non-die-cast member, mechanical joining using rivets or welding using high density energy heat resource such as laser welding, electron beam welding or arc welding (MIG welding) has been employed.

When the aforementioned welding members such as aluminum alloy die-cast members are welded, there are problems that a large amount of blowholes will be generated in the welded portion to cause a deterioration of the strength. This mainly results from the fact that a large amount of gases such as air are involved in the die-cast member due to the inherent features of die-casting method and that these gases will be emitted at the time of welding.

Although the generation of the aforementioned blowholes can be prevented by strictly controlling the gas content in the die-cast member, this requires to improve the quality of die-cast member, resulting in an increased cost.

This problem occurs not only at the time of welding two welding members including at least one aluminum alloy die-cast member but also at the time of performing bead-on welding for the purpose of improving the surface quality of welding members.

Under the circumstances, for the purpose of suppressing the generation of blowholes at the time of welding aluminum alloy die-cast welding members, the present inventors proposed an aluminum alloy filler wire for use in laser welding as disclosed in Japanese Unexamined Laid-open Patent Publication No. 2002-239782. In this proposed filler wire, the content of Al—K—F series flux to be contained in a filler is adjusted so as to satisfy the conditions of $1.5X-1.5 \leq Y \leq 2.0X$ and $Y>0$, wherein the hydrogen gas content in the aluminum alloy is represented by X cc/100 gAl and the mass ratio of the content of Al—K—F series flux contained in the filler is represented by Y %.

Furthermore, the present inventors proposed another aluminum alloy filler wire for use in laser welding as disclosed in Japanese Unexamined Laid-open Patent Publication No. 2001-353591. In this proposed filler wire, the mass ratio of the content of Al—K—F series flux contained in the filler is 0.05% or more but less than 1%.

As a conventional filler material capable of suppressing the generation of blowholes at the time of welding to improve the surface quality of aluminum alloy, Japanese Unexamined Laid-open Patent Publication No. 6-304780 proposes a welding aluminum wire in which a flux comprising Sodium (Na): 5 to 10%, Potassium (K): 40 to 45%, Oxygen(O): 5% or less, Sulfur (S): 5% or less, Fluorine (F): 5 to 10%, Chlorine (Cl): 35 to 40% is contained in the range of 0.1 to 8 wt %. Furthermore, Japanese Unexamined Laid-open Patent Publication No. 7-96396 proposes a welding aluminum filler material in which $C_2Cl_6$ powder is mixed by 0.05 to 20 wt %.

In recent years, for the purpose of attaining a further cost reduction at the time of applying aluminum alloy die-cast members to automobile members, non-heat treatment type aluminum alloy die-cast members, which does not require heat treatment after the die casting to adjust the mechanical property, have been developing.

This non-heat treatment type aluminum alloy die-cast material is, for example, an Al—Mg series alloy, an Al—Mg—Si series alloy, or an Al—Mg—Si—Mn series alloy, which contains Mg.

However, even in cases where non-heat treatment type aluminum die-cast members are welded by using filler material having the aforementioned blowhole generation suppressing effect, prescribed blowhole generation suppressing effect could not be attained. This is because Mg contained in the non-heat treatment type aluminum alloy die-cast members evaporates when melted at the time of welding and remains in the welded portion without being released therefrom.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a filler material capable of suppressing generation of blowholes in a welded portion to increase the strength of the welded portion at the time of welding joining members including at least one aluminum alloy die-cast member containing Mg.

Among other potential advantages, some embodiments can provide a welding method using the aforementioned filler material and a welded article welded by using the aforementioned filler material.

According to a first aspect of a preferred embodiment of the present invention, aluminum alloy filler material for use in welding of metal members including at least one aluminum die-cast member containing Mg, includes an aluminum or an aluminum alloy as base material and Al—K—F series flux, wherein the Al—K—F series flux is contained by 2 to 4 mass % with respect to the entire filler material.

In this filler material, the Al—K—F series flux is contained by 2 to 4 mass % with respect to the entire filler material. Therefore, in cases where metal members including at least one aluminum die-cast member containing Mg are welded using the filler material, the generation of blowholes in the welded portion due to gases contained in the die-cast member can be suppressed. Furthermore, the escaping of the evaporated Mg from the molten portion can be accelerated, which in turn suppresses the generation of blowholes in the welded portion due to the evaporation of Mg.

According to a second aspect of a preferred embodiment of the present invention, a welding method of welding metal members including at least one aluminum alloy die-cast member containing Mg, comprising: preparing aluminum alloy filler material including an aluminum or an aluminum alloy as base material and Al—K—F series flux, the Al—K—F series flux being contained by 2 to 4 mass % with respect to the entire filler material; and welding the metal members by using the aluminum alloy filler material.

According to a third aspect of a preferred embodiment of the present invention, a welded article obtained by welding metal members including at least one aluminum die-cast member containing Mg using filler material including an aluminum or an aluminum alloy as a base material and Al—K—F series flux, the Al—K—F series flux being contained by 2 to 4 mass % with respect to the entire filler material.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1:
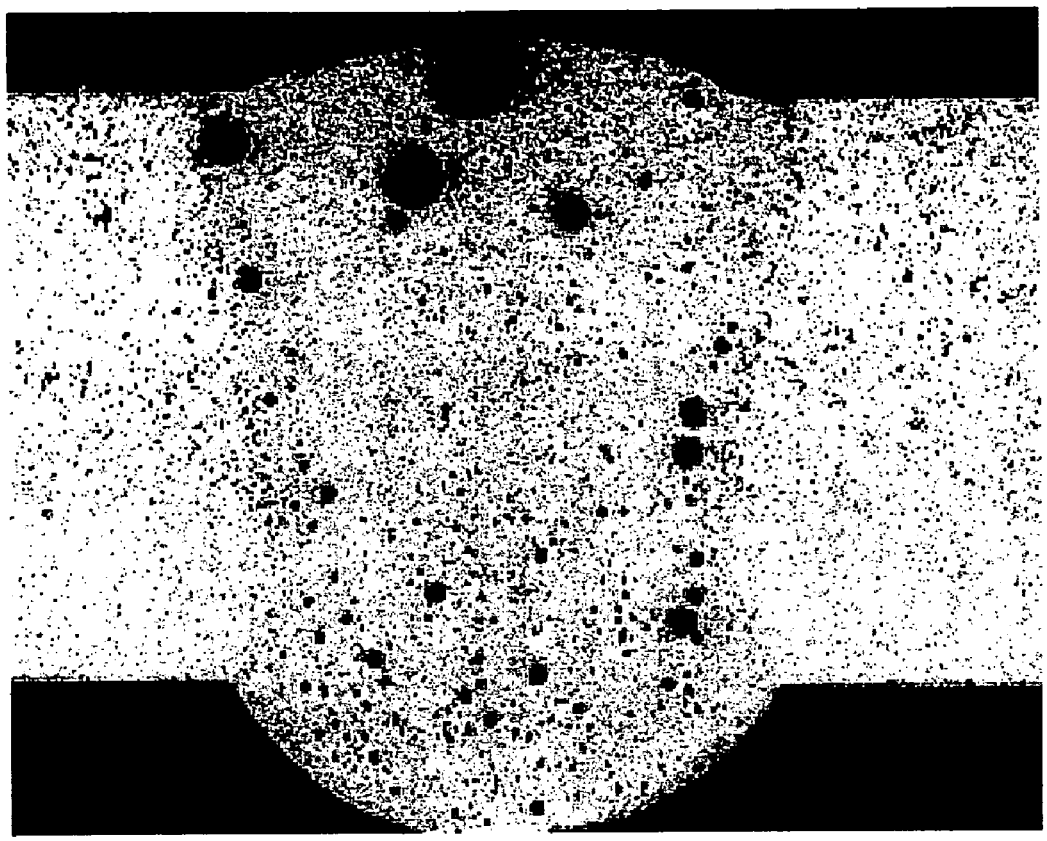
FIG. 1 is a cross-sectional view showing the welded portion of Example 4.
Figure 2:
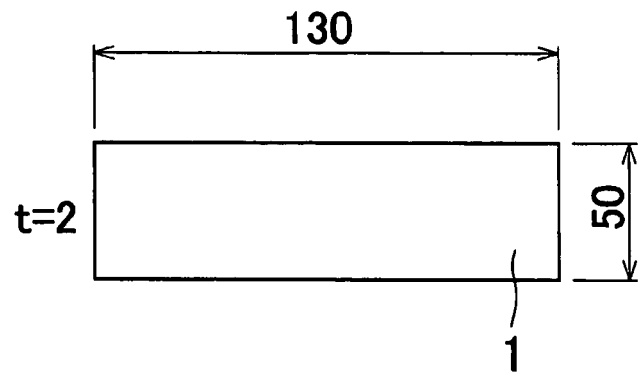
FIG. 2 is a plan view showing the configuration of the welding member used in Examples.

In the following paragraphs, some preferred embodiments of the invention will be described by way of example and not limitation. It should be understood based on this disclosure that various other modifications can be made by those in the art based on these illustrated embodiments.

The filler material according to an embodiment of the present invention contains Al—K—F series flux in an aluminum or aluminum alloy base material. This Al—K—F series flux contributes to blowhole generation suppressing effects by its effects of 1) deoxidization, 2) decreasing $H_2$ gas partial pressure due to priority evaporation of KF, 3) decreasing viscosity of the molten portion.

In the previously discussed aluminum alloy filler material disclosed in Japanese Unexamined Laid-open Patent Publication No. 2001-353591, since the welding target is an Al—Si series die-cast member, the content of Al—K—F series flux in the filler material is set to 0.05 to 1 mass %.

In an aluminum alloy die-cast member containing Mg, however, the Mg will evaporate during the welding step as previously discussed. Therefore, in order to make the evaporated Mg escape from the molten portion, it is required to improve the gas escape performance by further decreasing the viscosity of the molten portion. If the content of Al—K—F series flux in the filler material is less than 2 mass %, the gas escaping performance cannot be improved because of the insufficient viscosity drop of the molten portion, resulting in insufficient suppression of blowhole generation. To the contrary, if the content of Al—K—F series flux in the filler material exceeds 4 mass %, the amount of Al—K—F series intermediates due to the flux increases, causing deteriorated mechanical characteristics of the welded portion or the surface reformed portion.

Accordingly, in the present invention, the content of Al—K—F series flux in the filler material is set to 2 to 4 mass %. More preferably, the content of Al—K—F series flux is 2.5 to 3.5 mass %.

As the Al—K—F series flux, fluoride series flux which is a mixture comprising a mixture or an eutectic composition of $KAlF_4$, $K_2AlF_5$, $K_3AlF_6$ represented by a general formula: $K_\alpha AlF_{\alpha+3}$ ($\alpha$ is an integer of 1 or above), KF and $AlF_3$, and any one or more of fluoro potassium aluminate complexes can be exemplified because it is excellent especially in gas suppressing effect mentioned above. The preferable ratio of $KAlF_4$, $K_2AlF_5$ and $K_3AlF_6$ is $KAlF_4$: 65 to 95 mass % and one or two of $K_2AlF_5$ and $K_3AlF_6$ remaining 35 to 5 mass %.

The composition of the aluminum or aluminum alloy as base material of the filler material is not specifically limited, and various aluminum or aluminum alloys can be used. For example, Al—Mg series alloy can be preferably used. In cases where Al—Si series alloy is used as base material, this Si and Mg contained in the aluminum die-cast member as a base metal react to generate a large amount of Mg—Si series intermetallic compounds in the welded portion, which may cause a considerable deterioration of toughness and ductility of the welded portion.

Therefore, it is preferable to use an Al—Mg series alloy containing Mg in the same manner as the aluminum alloy die-cast member as base member and not causing a generation of intermetallic compounds in the welded portion, such as an Al-1.5 mass % Mg alloy or various Al—Mg series alloys belonging to JIS 5000 series alloy, or a mixture of the aforementioned two or more alloys. More preferably, the Mg content is 1.0 to 5 mass %. If the Mg content is less than 1.0 mass %, the welded metal deteriorates in strength and tends to easily crack. To the contrary, if the Mg content exceeds 5 mass %, intermetallic compounds easily generate, resulting in a breakable welded portion.

The filler material can be manufactured by various methods. According to an example, aluminum alloy powders as base material and Al—K—F series flux powders are mixed at a predetermined compounding ratio and pressurized into a solidified powder, and thereafter the solidified powder is formed into a wire shape or the like.

The shape of the filler member is not specifically limited. The filler member can be formed into various shapes, e.g., a wire shape or a plate shape. Among other things, a wire shape is preferable because this shape enables continuously supply during the welding operation.

The aluminum alloy die-cast member to be welded contains Mg because the application of the present invention becomes meaningless if the aluminum alloy die-cast member does not contain Mg. The effect of the present invention can be demonstrated more effectively in the case where the Mg content is 1.0 to 5 mass %.

As a Mg-contained aluminum alloy die-cast member, an Al—Mg series alloy, an Al—Mg—Si series alloy or an Al—Mg—Si—Mn series alloy can be exemplified.

The type of welding to be applied to the aforementioned Mg-contained aluminum alloy die-cast member is not limited to a specific one. For example, the welding can be welding a Mg-contained aluminum alloy die-cast member to a Mg-contained aluminum alloy die-cast member or welding a Mg-contained aluminum alloy die-cast member to an aluminum or aluminum alloy member. Further, it can be a bead-on welding to be applied to Mg-contained aluminum alloy die-cast members for the purpose of surface reforming.

Although the welding method is not specifically limited, a welding method utilizing a high-density energy source such as laser welding, electron beam welding, or arc welding (e.g., MIG welding) can be preferably used. It is more preferable to employ laser welding because the laser welding is high in power density and enables extremely high speed welding.

Using the aforementioned filler material, Mg-contained aluminum alloy die-cast members are welded. At the time of welding, the temperature rising in the welding portion causes an evaporation of Mg contained in the die-cast member. However, the functions of the Al—K—F series flux in the filler material suppress the generation of blowholes of $H_2$ gas or the like. In addition, the gas escaping effect due to the decreased viscosity of the molten portion will be demonstrated, which in turn accelerates the escape of evaporated Mg from the molten portion. As a result, the porosity area ratio which shows the degree of blowhole existence in the cooled and solidified welded portion decreases, which in turn increases the strength of the welded portion.

Especially, if the porosity area ratio is controlled to be less than 10%, it becomes possible to attain excellent strength. More preferable porosity area ratio is not larger than 6%.

In this disclosure, it is considered that the porosity area ratio of the welded portion is equivalent to the porosity volume ratio of the welded portion.

EXAMPLES

Hereinafter, Examples of the present invention will be explained.

(1) Welding Member (Base Member)

In Examples, an Al-3.5 mass % Mg-1.5 mass % Si-1.3 mass % Mn alloy was used. The manufacturing method was as follows.

The aforementioned material was molten at the temperature of 720° C., and then subjected to a bubbling treatment with argon gas for the purpose of removing intermediates and gases. Thereafter, a test piece was obtained by a vacuum die casting method. The die-casting was performed by using a vacuum die-casting machine having a mold clamping force of 320 tons as follows. After applying powder releasing agent to die assemblies, the casting was performed at the casting pressure of 60 MPa and high-speed injection speed of 4 m. The temperature of the molten metal at the time of casting was 700° C. The welding member 1 had a flat plate shape of 130 mm length×50 mm width×2 mm thickness.

The gas content of the manufactured welding member 1 was 1 to 5 cc/100 gAl. The gas content in the welding member was measured by a Lansley method.

(2) Filler Material (Filler Wire)

The compositions of the filler wires which are filler materials used in Examples are shown in Table 1.

Filler wire materials containing flux powders were manufactured by mixing aluminum alloy powders of Al-1.5 mass % Mg and flux powders, then pressurized into a solidified powder, and thereafter the solidified powder was subjected to a secondary process to obtain a wire of 1.2 mm diameter. Filler wire materials not containing flux powders were also manufactured by the same method.

Flux powders were manufactured by solving KF powders in water to obtain water solution, adding $AlF_3$ powders in this water solution to obtain a paste, then drying the paste and breaking the dried paste into powders. The amount of KF and $AlF_3$ was set to the mass ratio of KF:$AlF_3$=45:55.

(3) Welding Method

Figure 3A:
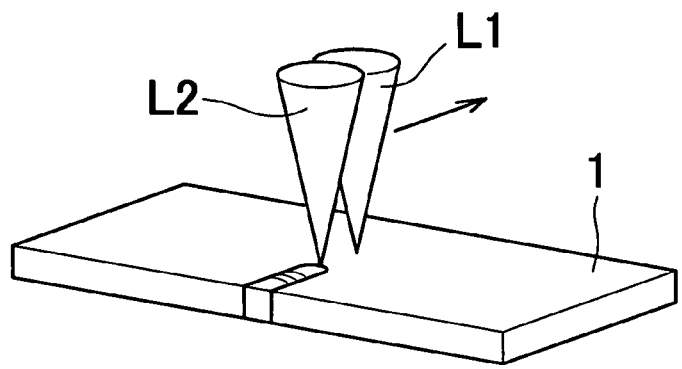
FIG. 3A is a schematic view showing the laser welding performed in Examples.
Figure 3B:
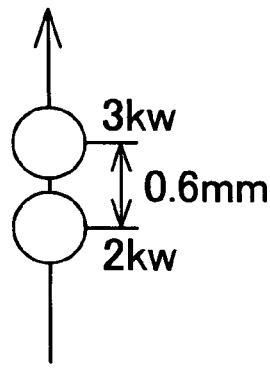
FIG. 3B is an explanatory view of the laser welding.

Prior to the welding, each die-cast material was subjected to surface polishing using a Nylon brush and degreasing treatment. The welding was performed by using Nd:YAG laser. As shown in FIGS. 3A and 3B, the laser beams L1 and L2 of output power of 3 kW and 2 kW respectively were set to have a beam distance of 0.6 mm to execute bead-on welding. The welding rate was 5 m/min., and the wire supplying rate was 5 m/min.

(4) Tensile Test

Figure 4:
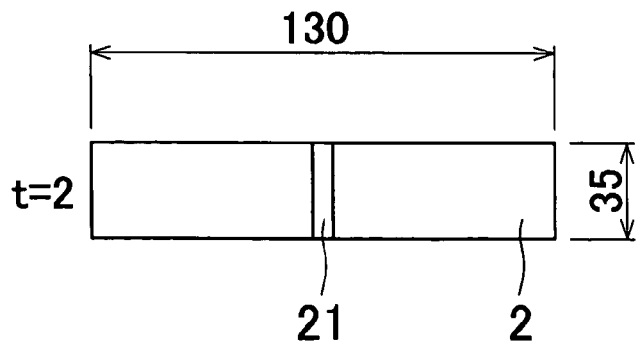
FIG. 4 is a plan view showing the test piece subjected to the tensile test in each Example.

From the welding member 1 to which bead-on welding was executed, a tensile test piece 2 of 130 mm length×35 mm width as shown in FIG. 4 was cut out, and subjected to a tensile test. At the time of manufacturing the tensile test piece 2, the excessive welded bead was cut in accordance with the plate thickness.

The tensile test was performed by using an Instron type universal testing machine at the tensile rate of 6 mm/min.

(5) Measurement of Porosity Area Ratio of Welded Portion

About the fractured surface of the tensile test piece 2 to which the tensile test was executed, the porosity area ratio of the welded portion 21 of was measured by an image analysis method. The measured area at the time of measuring the porosity area ratio was about 25 $mm^2$.

The tensile test results and the measured results of the porosity area ratio of the welded portion 21 are shown in Table 1. The cross-section of the welded portion of the test piece of Example 4 is shown in FIG. 1.

TABLE 1

|  | Filler wire | | Welded bead portion | | | | |
|---|---|---|---|---|---|---|---|
|  | Flux (mass %) | Base material | Porosity area ratio (%) | Tensile strength (Mpa) | Tensile strength with respect to Base member (%) | Elongation after fracture | Evaluation |
| Comparative Example 1 | 0.0 | Al-10 mass % Si | 34.5 | 144 | 50 | 5.1 | Insufficient Strength |
| Comparative Example 2 | 0.0 |  | 29.7 | 139 | 48 | 8.6 | Insufficient Strength |
| Comparative Example 3 | 0.0 | Al-1.5 mass % Mg | 30.5 | 146 | 50 | 10.2 | Insufficient Strength |
| Comparative Example 4 | 0.0 |  | 27.8 | 151 | 52 | 10.3 | Insufficient Strength |
| Comparative Example 5 | 0.5 |  | 37.5 | 133 | 46 | 4.6 | Insufficient Strength |
| Comparative Example 6 | 0.5 |  | 33.5 | 142 | 49 | 4.9 | Insufficient Strength |
| Comparative Example 7 | 0.5 |  | 26.4 | 147 | 51 | 9.8 | Insufficient Strength |
| Comparative Example 8 | 1.0 |  | 15.3 | 177 | 61 | 11.8 | Insufficient Strength |
| Comparative Example 9 | 1.0 |  | 22.3 | 151 | 52 | 10.9 | Insufficient Strength |
| Comparative Example 10 | 1.0 |  | 15.4 | 228 | 79 | 12.0 | Insufficient Strength |
| Example 1 | 2.0 |  | 10.3 | 244 | 84 | 12.7 | Good |
| Example 2 | 2.0 |  | 11.3 | 252 | 87 | 12.2 | Good |
| Example 3 | 2.0 |  | 9.8 | 258 | 89 | 13.1 | Good |
| Example 4 | 3.0 |  | 5.6 | 289 | 100 | 15.4 | Good |
| Example 5 | 3.0 |  | 5.8 | 285 | 98 | 15.1 | Good |
| Example 6 | 3.0 |  | 10.5 | 277 | 96 | 13.3 | Good |
| Example 7 | 4.0 |  | 7.6 | 281 | 97 | 13.8 | Good |
| Example 8 | 4.0 |  | 6.1 | 291 | 100 | 14.6 | Good |
| Example 9 | 4.0 |  | 9.5 | 278 | 96 | 12.9 | Good |
| Comparative Example 11 | 5.0 |  | 8.6 | 240 | 83 | 10.5 | Decreased toughness |
| Comparative Example 12 | 5.0 |  | 7.9 | 258 | 89 | 11.1 | Decreased toughness |
| Comparative Example 13 | 5.0 |  | 10.2 | 232 | 80 | 9.8 | Decreased toughness |

As understood from Table 1, when the filler wire containing the flux in the range of 2 to 4 mass % is used, the welded portion is small in porosity area ratio and excellent in strength and in elongation after fracture.

Figure 5:
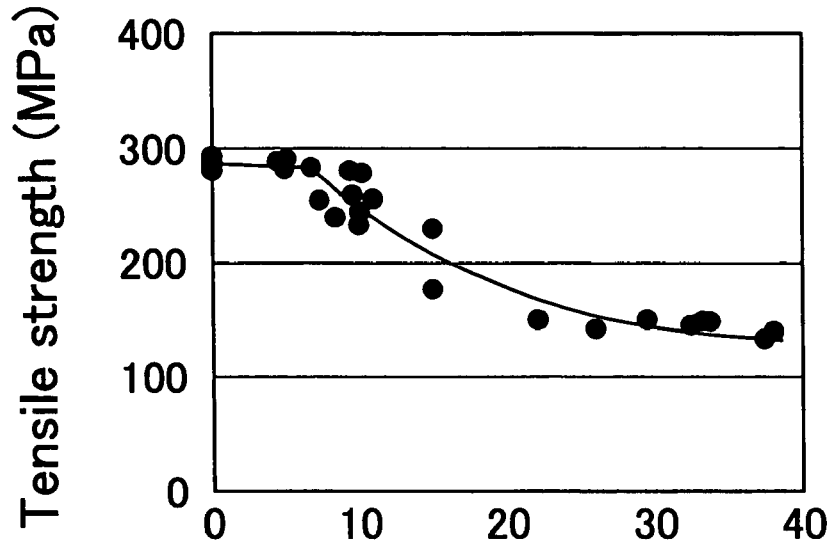
FIG. 5 is a graph showing the relationship between the fracture surface porosity of the welded portion and the tensile strength of Examples.
Figure 6:
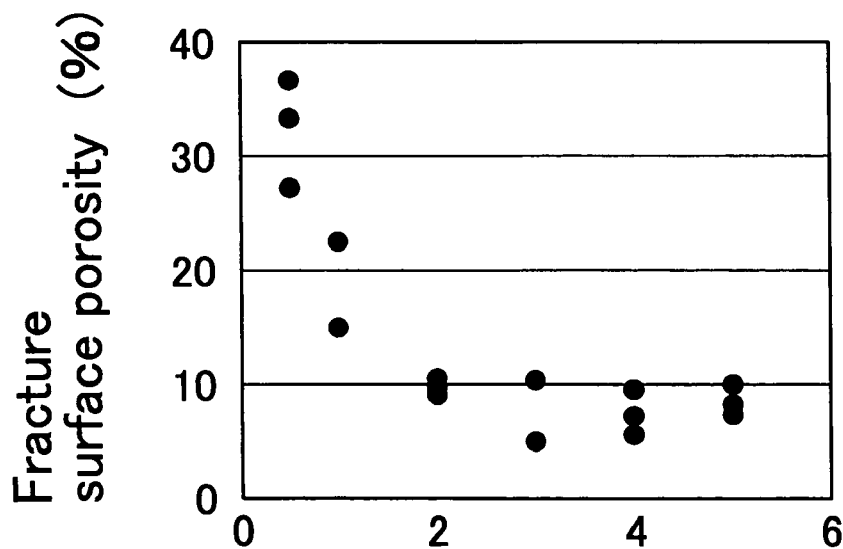
FIG. 6 is a graph showing the relationship between the flux content of the filler wire and the fracture surface porosity of Examples.

The relationship between the fracture surface porosity and the tensile strength in the welded portion 21 is shown by the graph of FIG. 5, and the relationship between the flux content in the filler wire and the fractured surface porosity area ratio is shown by the graph of FIG. 6.

As will be understood from Table 1 and FIG. 5, although the tensile strength tends to decrease as the porosity area ratio increases, the decreasing rate of the tensile strength is small when the fracture surface porosity is not larger than 10%.

Furthermore, as will be understood from Table 1 and FIG. 6, even if the flux content in the filler wire falls within the range of 2 to 4 mass %, when the porosity area ratio is controlled to be 10% or less, further enhanced strength can be obtained.

Furthermore, even if the porosity area ratio is 10% or less, in Comparative Examples 11 and 12 in which the flux content in the filler wire exceeds 4 mass %, the tensile strength decreased although the porosity area ratio of the welded portion is not larger than 10%. The fractured surface SEM observed result of the test piece of Comparative Example 11 (the flux content in the filler wire is 5 mass %) after the tensile test is shown in FIG. 7.

Figure 7:
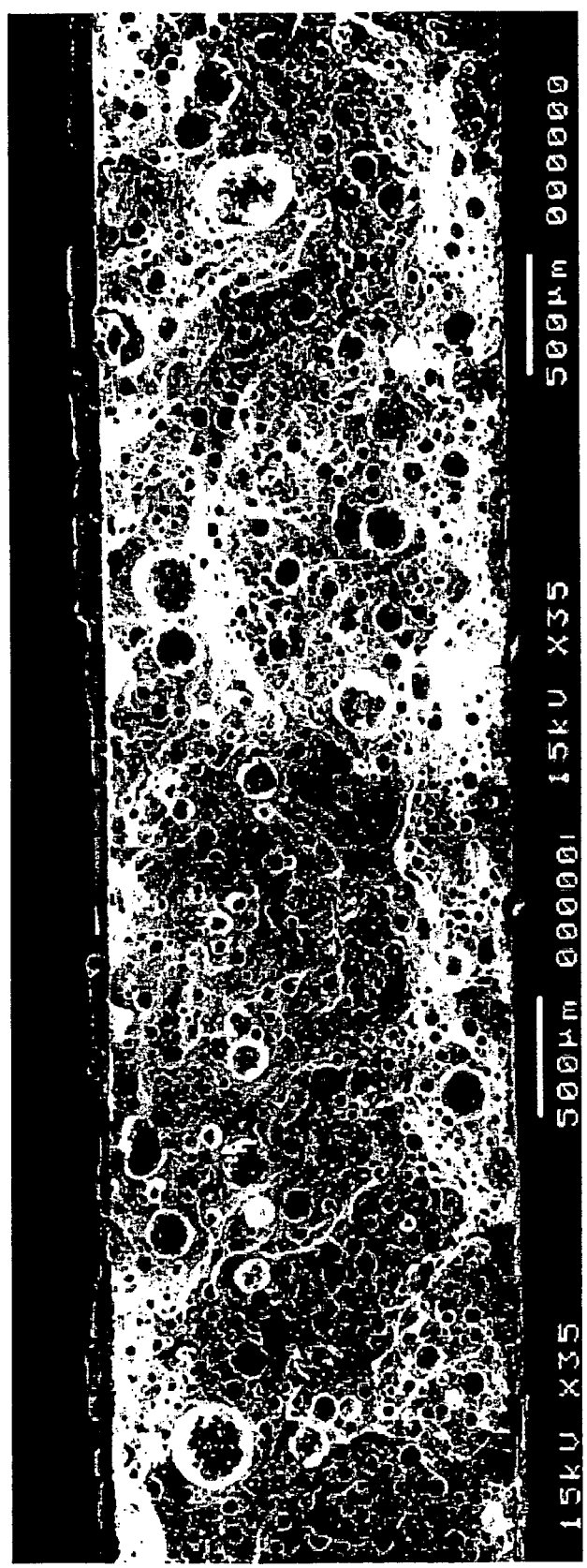
FIG. 7 is a cross-section showing the welded portion of Comparative Example 11.

As shown in FIG. 7, when the flux content is 5 mass %, it is recognized that Al—K—F series intermediate (circular particle with the white periphery in FIG. 7) due to the flux grows. Accordingly, it is considered that the strength is decreased in spite of the small porosity area ratio of the welded portion.

Figure 8:
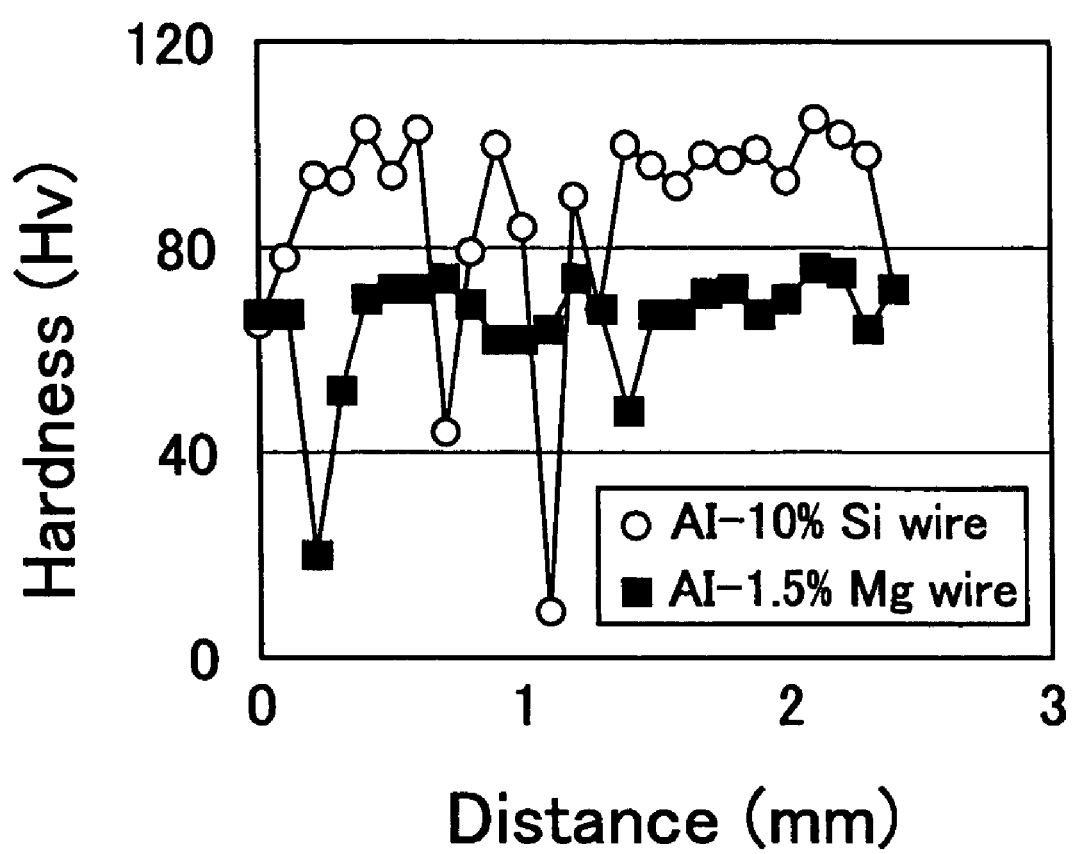
FIG. 8 is a graph showing the measured results of the welded portion in the case of using Al-10% Si alloy as base material of the filler wire and in the case of using Al-1.5% Mg alloy as base material of the filler wire.

In FIG. 8, the measured results of the hardness of the laser welded portion in the case of using Al-10% Si alloy and Al-1.5 mass % Mg alloy as base material are shown.

Due to the effects of the porosity, the data spread of hardness is very large. The hardness of the welded portion in which Al-10 mass % Si alloy is used as base material was about 100 Hv. To the contrary, the hardness of the welded portion in which Al-1.5 mass % Mg alloy is used as base material was about 75 Hv. As will be understood from the above, when Al-10 mass % Si alloy is used as base material, although the hardness of the welded portion increases, the elongation after fracture at the time of the tensile test is about 5 to 10% which is considerably inferior to the elongation after fracture (20%) of the base material.

This is believed that when Al—Si series alloy is used as base material Mg in the die-cast member and Si in the filler wire will generate a large amount of Mg—Si series intermetallic compounds, which enhances the hardness of the welded portion but considerably deteriorates the ductility and the toughness. From this viewpoint, it is believed that Al—Mg series alloy is preferably used as base material of the filler wire.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An aluminum alloy filler material for use in welding of metal members including at least one aluminum die-cast member containing Mg, the filler material comprising:
   an aluminum or aluminum alloy as base material; and
   Al—K—F series flux,
   wherein said Al—K—F series flux is contained by 2 to 4 mass % with respect to the entire filler material.

2. The aluminum alloy filler material as recited in claim 1, wherein said aluminum or aluminum alloy as base material is an Al—Mg series alloy.

3. The aluminum alloy filler material as recited in claim 1, wherein said Al—K—F series flux is a mixture comprising a mixture or an eutectic composition of $KAlF_4$, $K_2AlF_5$, $K_3AlF_6$, $KF$ and $AlF_3$ and any one or more of fluoro potassium aluminate complexes.

4. The aluminum alloy filler material as recited in claim 1, wherein said aluminum die-cast member is made of an Al—Mg series alloy.

5. The aluminum alloy filler material as recited in claim 1, wherein said aluminum die-cast member is made of an Al—Mg—Si series alloy.

6. The aluminum alloy filler material as recited in claim 1, wherein said aluminum die-cast member is made of Al—Mg—Si—Mn series alloy.

7. The aluminum alloy filler material as recited in claim 1, wherein said welding is laser welding, and wherein said filler material is in a shape of wire.

8. A welding method of welding metal members including at least one aluminum alloy die-cast member containing Mg, said welding method, comprising:
preparing aluminum alloy filler material including an aluminum or an aluminum alloy as base material and Al—K—F series flux, said Al—K—F series flux being contained by 2 to 4 mass % with respect to the entire filler material; and
welding said metal members by using said aluminum alloy filler material.

9. The welding method as recited in claim 8, wherein said aluminum or aluminum alloy as base material is an Al—Mg series alloy.

10. The welding method as recited in claim 8, wherein said Al—K—F series flux is a mixture comprising a mixture or an eutectic composition of $KALF_4$, $K_2AlF_5$, $K_3AlF_6$, KF and $AlF_3$ and any one or more of fluoro potassium aluminate complexes.

11. The welding method as recited in claim 8, wherein said aluminum diecast member is made of an Al—Mg series alloy.

12. The welding method as recited in claim 8, wherein said aluminum diecast member is made of an Al—Mg—Si series alloy.

13. The welding method as recited in claim 8, wherein said aluminum diecast member is made of an Al—Mg—Si—Mn series alloy.

14. The welding method as recited in claim 8, wherein said welding is laser welding, and wherein said filler material is in a shape of wire.

15. An aluminum alloy filler material for welding plural metal members, comprising:
a base material comprising aluminum; and
a flux comprising an Al—K—F series flux and mixed into the base material in an amount sufficient to suppress generation of blowholes in the filler material when welding the metal members,
wherein the amount of said flux is in a range of 2 to 4 mass % with respect to the filler material.

16. An aluminum alloy filler material for welding plural metal members, comprising:
a base material comprising aluminum; and
a flux comprising an Al—K—F series flux and mixed into the base material in an amount sufficient to suppress generation of blowholes in the filler material when welding the metal members,
wherein the amount of said flux is in a range of 2.5 to 3.5 mass % with respect to the filler material.

* * * * *